July 6, 1971   N. N. BUCHSBAUM   3,591,617
PURIFICATION OF TOLUENE DIISOCYANATE
Filed March 7, 1968
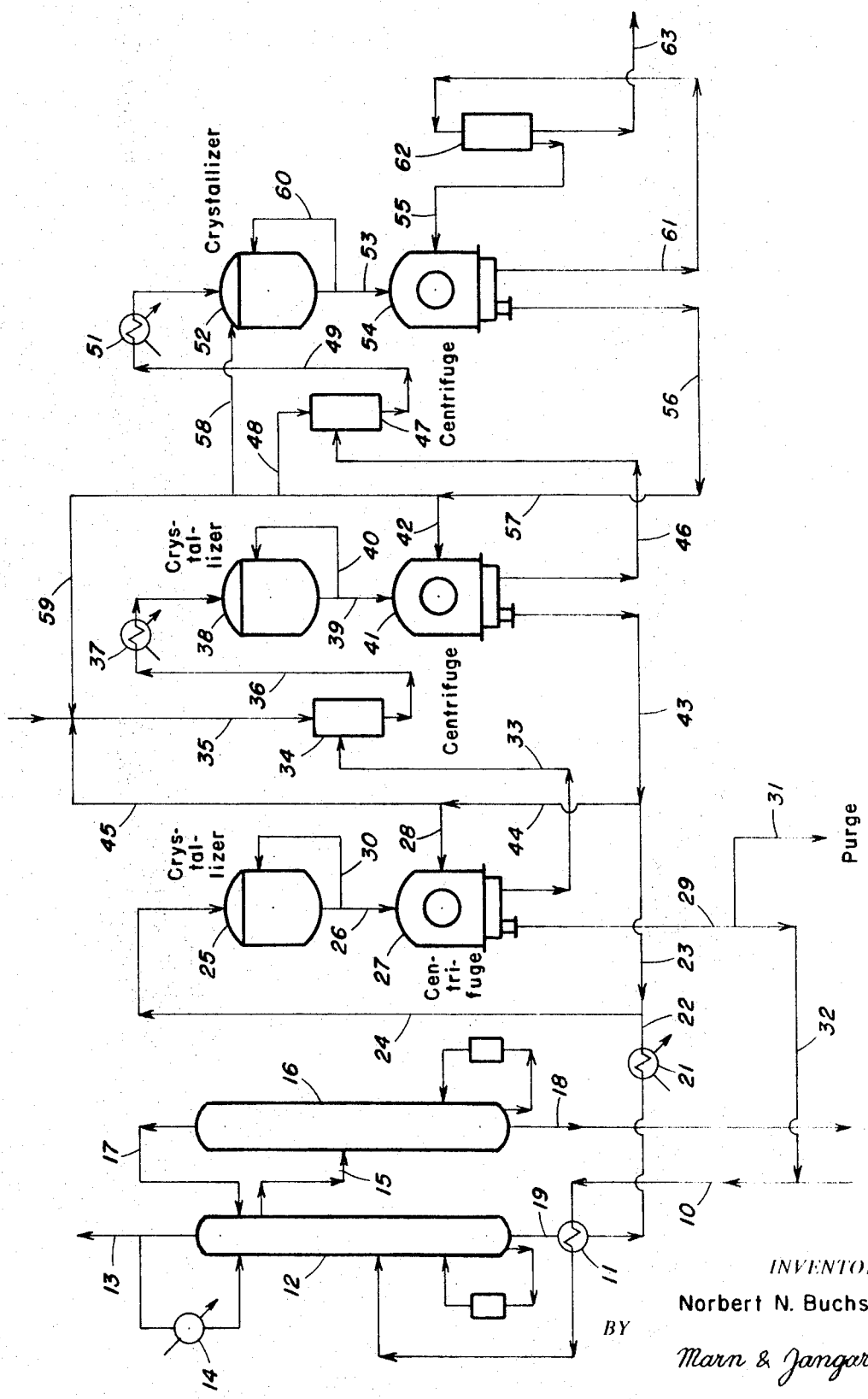
INVENTOR.
Norbert N. Buchsbaum
BY
Marn & Jangarathis
ATTORNEYS 3,591,617
PURIFICATION OF TOLUENE DIISOCYANATE
Norbert N. Buchsbaum, Clifton, N.J., assignor to The Lummus Company, Bloomfield, N.J.
Filed Mar. 7, 1968, Ser. No. 711,321
Int. Cl. C07c 119/04
U.S. Cl. 260—453                                            1 Claim

ABSTRACT OF THE DISCLOSURE

A process for purifying a crude organic isocyanate, such as toluene diisocyanate, wherein the crude isocyanate is dissolved in a suitable solvent and the solution cooled to a temperature at which a portion of the isocyanate crystallizes. The crystals are separated from the mother liquor and a portion of the mother liquor is recycled to the crude isocyanate stream while the remaining portion is purged from the system. The crystals are then dissolved in a mixture of fresh solvent and mother liquor recycled from a subsequent stage. The number of stages employed depends on the desired purity of the final product. The temperature employed in each crystallization stage is higher than in the previous crystallization, thereby providing a mother liquor richer in isocyanate than the preceding stage. The isocyanate crystals from the last stage are recovered as final product.

---

This invention relates to organic isocyanates and more particularly to an improved process for effecting purification of crude organic isocyanates.

In the production of organic isocyanates, the reaction effluent is subjected to a series of distillations in order to recover the desired isocyanate in high purity. Organic isocyanates are generally heat sensitive and, therefore, subject to thermal degradation, resulting in as much as a 4% or 5% loss of product during the recovery operation, even when vacuum distillation is employed. In view of the relatively high cost of material, such losses materially increase the overall costs of production.

Accordingly, an object of this invention is to provide a new and improved process for purifying crude organic isocyanates.

Another object of this invention is to provide a process for recovering organic isocyanates which reduces product loss caused by thermal degradation.

A further object of this invention is to provide a process for producing an organic isocyanate in high purity directly from the effluent from an organic isocyanate production zone.

Yet another object of this invention is to provide a process for recovering an organic isocyanate in high purity from impure dilute solutions thereof.

A still further object of this invention is to provide a new and improved process for purifying organic isocyanates which is particularly applicable to the recovery of toluene diisocyanate.

These and other objects of this invention should become more readily apparent from the following detailed description of the invention when read with reference to the accompanying drawing wherein:

The drawing is a simplified schematic flow sheet illustrating an embodiment of the invention.

The objects of this invention are broadly accomplished by purifying a crude organic isocyanate by a fractional crystallization technique. More particularly, a crude organic isocyanate, either in the reaction solvent or dissolved in a suitable solvent, is cooled to effect crystallization of a portion thereof. The crystals are separated from the mother liquor and a portion of the mother liquor is admixed with the crude organic isocyanate prior to crystallization. Several stages of crystallization are employed with the number of stages used being dependent upon the desired purity. The recovered crystals from each stage are dissolved in mother liquor from a subsequent stage or in a mixture of mother liquor and fresh solvent and the resulting solution cooled to a temperature to effect partial crystallization of the isocyanate. The temperature employed for effecting such partial crystallization is greater than the temperature employed in the previous crystallization thereby providing a mother liquor richer in the organic isocyanate. Thus, the dissolution and recrystallization may be repeated one or more times depending upon the purity desired with the temperature employed for effecting crystallization increasing in such successive stage. In general, the mother liquor from the last crystallization stage comprises essentially the organic isocyanate with only a very minor portion of impurities.

The invention will now be further described with reference to a specific embodiment thereof illustrated in the accompanying drawing. It is to be understood that although the embodiment is described with reference to the purification of toluene diisocyanate the embodiment is equally applicable to the purification of other organic isocyanates, as hereinafter described.

Referring now to the drawing, an effluent from an isocyanate production zone in line 10, containing toluene diisocyanate, the starting amine, phosgene, hydrogen chloride, the reaction solvent, such as monochlorobenzene, and impurities is passed through heat exchanger 11 to effect heating thereof, as hereinafter described, and introduced into a fractionator 12. The fractionator 12 is operated at a temperature and pressure to effect separation of the lighter components, i.e., phosgene and hydrogen chloride, from the reaction mixture, such lighter components being withdrawn as overhead from the fractionator 12 through line 13. A portion of the overhead in line 13 is recycled to the fractionator 12 through condenser 14 to provide the reflux requirements therefor.

A liquor sidestream, primarily containing monochlorobenzene and some lighter components; i.e., phosgene and hydrogen chloride is withdrawn from the upper portion of the fractionator 12 through line 15 and introduced into a distillation tower 16 wherein the lighter components are stripped therefrom. The lighter components are withdrawn from tower 15 through line 17 and recycled to the fractionator 12. A monochlorobenzene bottoms is withdrawn from tower 16 through line 18 and recycled to the isocyanate production zone.

A bottoms, comprised of a dilute solution of toluene diisocyanate and impurities in monochlorobenzene, is withdrawn from the fractionator 12 through line 19 and passed through heat exchanger 11 to indirectly heat the feed to the fractionator 12 and then through heat exchanger 21 to effect further cooling thereof. The now cooled bottoms in line 22 is combined with a mother liquor in line 23, as hereinafter described, and the mixture passed through line 24 to a first stage crystallizer 25. The toluene diisocyanate solution in crystallizer 25 is indirectly cooled by a suitable refrigerant (not shown) to a temperature at which a portion of the toluene diisocyanate is crystallized from the solution.

A slurry of toluene diisocyanate crystals in mother liquor (a solution of toluene diisocyanate and impurities in monochlorobenzene) is withdrawn from crystallizer 25 through line 26 and introduced into a first stage centrifuge 27 wherein the crystals are separated from the mother liquor. A portion of the slurry in line 26 is recycled to the crystallizer 25 through line 30. The crystals are also washed in centrifuge 27 with mother liquor, introduced through line 28 and obtained from a second stage crystallizer as hereinafter described.

The mother liquor is withdrawn from centrifuge 27 through line 29 and a portion thereof purged through line 31. The remaining portion of the mother liquor is passed through line 32 and combined with the reaction product in line 10 for passage to the fractionator 12.

Toluene diisocyanate crystals are withdrawn from centrifuge 27 through line 33 and introduced into a melter 34 wherein the crystals are melted and dissolved in a mixture introduced through line 35, containing fresh solvent, i.e., monochlorobenzene, and mother liquor from second and third crystallization stages, as hereinafter described.

The toluene diisocyanate solution is withdrawn from melter 34 through line 36, passed through heat exchanger 37 to effect cooling thereof and introduced into a second stage crystallizer 38. The toluene diisocyanate solution in crystallizer 38 is indirectly cooled by a suitable refrigerant (not shown) to a temperature at which a portion of the toluene diisocyanate is crystallized from the solution, the temperature being higher than the temperature in first stage crystallizer 25 thereby producing a mother liquor richer in toluene diisocyanate.

A slurry of toluene diisocyanate crystals in mother liquor (a solution of toluene diisocyanate and impurities in monochlorobenzene) is withdrawn from crystallizer 38 through line 39 and introduced into a second stage centrifuge 41 wherein the crystals are separated from the mother liquor. A portion of the slurry in line 39 is recycled to the crystallizer 38 through line 40. The crystals are also washed in centrifuge 41 with mother liquor introduced through line 42 and obtained from a third stage crystallizer, as hereinafter described.

The mother liquor is withdrawn from centrifuge 41 through line 43 and a portion thereof passed through line 23 to be mixed with the feed to the first stage crystallizer in line 22. The remaining mother liquor in line 44 is divided into two portions, with one portion being introduced into the first stage centrifuge 27 through line 28 to wash the crystals therein and the other portion being passed through line 45 and combined with fresh solvent in line 35 for introduction into the melter 34.

Toluene diisocyanate crystals are withdrawn from the centrifuge 41 through line 46 and introduced into a melter 47 wherein the crystals are melted and combined with mother liquor from a third crystallization stage, introduced through line 48. The mother liquor from the third crystallization stage is comprised essentially of toluene diisocyanate.

The liquid toluene diisocyanate is withdrawn from melter 47 through line 49, passed through heat exchanger 51 to effect cooling thereof, and introduced into a third stage crystallizer 52. The liquid toluene diisocyanate in crystallizer 52 is indirectly cooled by a suitable refrigerant (not shown) to a temperature at which a portion of the toluene diisocyanate crystallizes, the temperature being higher than the temperature in the second stage crystallizer 38.

A slurry of toluene diisocyanate crystals in mother liquor (a liquor comprised essentially of toluene diisocyanate and some impurities) is withdrawn from crystallizer 52 through line 53 and introduced into a third stage centrifuge 54 wherein the crystals are separated from the mother liquor. A portion of the slurry in line 53 is recycled to crystallizer 52 through line 60. The crystals are also washed in centrifuge 54 with liquid toluene diisocyanate introduced through line 55 and obtained as hereinafter described.

The mother liquor is withdrawn from centrifuge 54 through line 56 and a portion thereof introduced into second stage centrifuge 41 through line 42 to effect washing of the crystals therein. The remainder of the mother liquor in line 57 is divided into three portions, with a first portion being passed through line 48 to melter 47, a second portion being passed through line 58 to third stage crystallizer 52 to maintain a desired slurry consistency and a third portion being passed through line 59 and combined with fresh solvent and mother liquor from the second stage centrifuge in line 35 for introduction into the melter 34.

The toluene diisocyanate crystals are withdrawn from the centrifuge 54 through line 61 and introduced into a melter 62 to effect melting thereof. The major portion of the liquid toluene diisocyanate from melter 62 is withdrawn as product through line 63 and the remaining portion passed through line 55 to wash the crystals in centrifuge 54.

The invention is further illustrated by the following example but the scope of the invention is not to be limited thereby.

EXAMPLE

A crude 50% solution of toluene diisocyanate in monochlorobenzene in line 22 is recovered and purified, employing the conditions tabulated below. The mother liquor from the first stage crystallizer comprises 25% toluene diisocyanate and 75% monochlorobenzene and impurities. The mother liquor from the second stage crystallizer comprises 80% toluene diisocyanate and 20% monochlorobenzene and impurities.

The mother liquor from the third stage crystallizer comprises essentially toluene diisocyanate and only a very minor portion of impurities.

TABLE

| Line | Temp., °F. | Flow rate, lbs./hr. |
|---|---|---|
| 22 | 0 | 690 |
| 23 | 33 | 60 |
| 26 | −31 | 750 |
| 28 | +33 | 30 |
| 29 | −31 | 600 |
| 33 | −31 | 180 |
| 36 | 70 | 580 |
| 39 | 32 | 580 |
| 42 | 53 | 20 |
| 43 | 33 | 450 |
| 45 | 33 | 360 |
| 46 | 32 | 150 |
| 48 | 53 | 250 |
| 49 | 70 | 400 |
| 53 | 52 | 400 |
| 55 | 80 | 10 |
| 56 | 53 | 300 |
| 59 | 53 | 30 |
| 61 | 52 | 110 |
| 63 | 80 | 100 |

The process hereinabove described with reference to a specific embodiment thereof may be varied in numerous ways within the spirit and scope of the invention. Thus, for example, only two crystallization stages may be employed if a product of lower purity is desired or more than three crystallization stages may be employed to achieve a still greater purity.

As another modification, the cooling in the crystallization stages may be effected in a manner otherwise than as particularly described. Thus, for example, the cooling may be effected external to the crystallization vessels or by direct heat transfer with a compatible refrigerant.

As further modifications, the mother liquor may be recycled to the crystallization stages otherwise than as particularly described and fresh solvent may be added in more than one crystallization stage or mother liquor employed as the sole solvent.

In addition, as hereinabove noted, the process of this invention is applicable to the recovery and purification of organic isocyanates in general, including alkyl, cycloalkyl, alkaryl, aralkyl, aryl, hydroaryl, heterocyclic, mono-, di-, and polyisocyanates. Thus, the process may be employed for recovering and purifying organic isocyanates produced by reacting phosgene with an appropriate amine, as for example: hexyl isocyanate from hexylamine; octyl isocyanate from octylamine; dodecyl isocyanate from dodecylamine; octadecyl isocyanate from octadecylamine; tetramethylene diisocyanate from tetramethylenediamine; pentamethylene diisocyanate from pentamethylene diamine; octamethylene diisocyanate from octamethylenediamine; undecamethylene diisocyanate from undecamethylenediamine; dodecamethylene diisocyanate from dodecamethylenediamine; 3,3'-diisocyanate dipropylether from 3,3'-diaminodipropylether, etc., cyclohexyl isocyanate from cyclohexylamine; tetrahydro-β-naphthyl isocyanate from tetrahydro-α-naphthylamine, etc.; xylene diisocyanates from xylenediamines; diphenylmethane 4,4'-diisocyanate from 4,4'-diamino-diphenylmethane; β,β-diphenylpropane 4,4'-diisocyanate from 4,4' - diamino - β - diphenylpropane, etc.; benzyl isocyanate from benzylamine; phenylethyl isocyanate from phenylethylamine; p-isocyano benzyl isocyanate from p-aminobenzylamine, etc.; phenyl isocyanate from aniline; p-cetyl phenyl isocyanate from p-cetylaniline; p-dodecylphenyl isocyanate from p-dodecylaniline; 5-dodecyl-2-methylphenyl isocyanate from 5-dodecyl-o-toluidine; 3-nitro-4-dodecylphenylisocyanate from 3-nitro-4-dodecyl aniline; p - cetyloxyphenyl isocyanate from p - cetyloxyaniline; metaphenylene diisocyanate from metaphenylene diamine; p-phenylene diisocyanate from p-phenylenediamine; 1-methylphenylene-2,4-diisocyanate from 1-methyl phenylene-2,4-diamine; naphthylene 1,4-diisocyanate from 1,4-naphthylene diamine; 2,6-tolylene diisocyanate from 2,6-toluenediamine; tetrahydrofurfuryl isocyanate from tetrahydrofurfurylamine, etc. It will be understood that the process of the invention is also applicable to the recovery of organic isocyanates produced by other reactions and from other components, for example, materials which liberate phosgene during the reaction may be employed instead of phosgene or potassium cyanate may be reacted with an organic sulfate to produce the corresponding organic isocyanate. Another method for producing organic isocyanates involves pyrolyzing an N-substituted carbonate and separating the corresponding isocyanate from the pyrolysis products. The foregoing reactions may be conducted in the absence of any inert organic liquid diluent or in the presence of any one of a large number of previously disclosed inert organic liquid diluents.

Solvents which may be employed as either the reaction solvent or as a solvent in subsequent crystallization stages have been disclosed in the literature and include: toluene; xylene; chlorobenzene; orthodichlorobenzene; tetrahydronaphthalene; benzene; chlorotoluenes; dichlorobenzene, nitrobenzene, cyclohexane, kerosene, carbon tetrachloride, tetrachloroethylene, trichloroethylene, trichlorobenzene, decahydronaphthalene, tetrahydronaphthalene, amylbenzene, ortho, meta and paracymenes, dodecylbenzene, naphthalene, heptylcyclopentane, diphenyl and partially hydrogenated aromatic hydrocarbons, boiling above 340° C., chlorinated diphenyls, heptane; decahydronaphthalene, amylbenzene, tetrahydronaphthalene, cymene, dioxane, dibutylether and dialkyl ketones.

The process of the invention is very effective for recovering and purifying organic isocyanates. The process is effected at low temperatures thereby preventing thermal degradation of final product which results in increased yields. In addition, the recovery and purification process may be effected directly on dilute organic isocyanate solutions recovered from an isocyanate production zone. Moreover, the process may be operated continuously, and, therefore, may be readily incorporated into an isocyanate production plant.

Numerous modifications and variations of the present invention are possible in light of the above teachings and, therefore, it is to be understood that within the scope of the appended claim, the invention may be practiced otherwise than as particularly described.

What is claimed is:

1. A process for purifying a crude toluene diisocyanate solution obtained from the phosgenation of toluene diamine in monochlorobenzene, comprising:
   (a) cooling the crude solution of toluene diisocyanate containing 50% toluene diisocyanate in monochlorobenzene to a temperature of −31° F. to provide a slurry of toluene diisocyanate crystals in a mother liquor containing 25% toluene diisocyanate;
   (b) separating the toluene diisocyanate crystals formed in step (a);
   (c) melting the toluene diisocyanate crystals from step (b) and forming a solution thereof in monochlorobenzene and mother liquor from hereinafter steps (f) and (e);
   (d) cooling the solution from step (c) to 32° F. to provide a slurry of toluene diisocyanate crystals in a mother liquor containing 80% toluene diisocyanate;
   (e) separating the toluene diisocyanate crystals from the mother liquor of step (d);
   (f) passing mother liquor from step (e) to step (c);
   (g) melting toluene diisocyanate crystals from step (e) and forming a solution thereof in a mother liquor of toluene diisocyanate from hereinafter step (j);
   (h) cooling the solution from step (g) to a temperature of 52° F. to provide a slurry of toluene diisocyanate crystals in a mother liquor of toluene diisocyanate;
   (i) recovering the crystals from the toluene diisocyanate mother liquor as purified toluene diisocyanate; and
   (j) passing toluene diisocyanate mother liquor to steps (c) and (g).

References Cited
UNITED STATES PATENTS

| | | | |
|---|---|---|---|
| 2,218,030 | 10/1940 | Pöhls et al. | 260—453X |
| 2,428,843 | 10/1947 | Georges et al. | 260—453X |
| 2,643,264 | 6/1953 | Fauser | 260—453 |
| 2,901,497 | 8/1959 | Delfs et al. | 260—453 |
| 3,144,474 | 8/1964 | Kantyka | 260—453 |
| 3,211,631 | 10/1965 | Fuchs | 260—453X |
| 3,217,024 | 10/1965 | Parks et al. | 260—453 |
| 3,232,069 | 2/1966 | Hawkins | 260—707X |

CHARLES B. PARKER, Primary Examiner

D. A. TORRENCE, Assistant Examiner

U.S. Cl. X.R.

260—707